United States Patent
Kang et al.

(10) Patent No.: US 8,549,659 B2
(45) Date of Patent: Oct. 1, 2013

(54) NON-VOLATILE MEMORY FOR ANTI-CLONING AND AUTHENTICATION METHOD FOR THE SAME

(75) Inventors: Bo-Gyeong Kang, Gyeonggi-do (KR); Jung-Wan Ko, Gyeonggi-do (KR); Byung-Rae Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 44 days.

(21) Appl. No.: 13/230,414

(22) Filed: Sep. 12, 2011

(65) Prior Publication Data

US 2012/0066774 A1    Mar. 15, 2012

(30) Foreign Application Priority Data

Sep. 10, 2010 (KR) .......... 10-2010-0088960
Oct. 11, 2010 (KR) .......... 10-2010-0099010
Sep. 2, 2011 (KR) .......... 10-2011-0089051

(51) Int. Cl.
  *G06F 1/26* (2006.01)
  *H04L 9/32* (2006.01)
(52) U.S. Cl.
  USPC .............................. 726/34; 713/193; 713/194
(58) Field of Classification Search
  USPC ............... 380/44, 46; 713/168–17, 192–194, 713/168–170, 176–189; 726/34; 709/212–216
  See application file for complete search history.

(56) References Cited

U.S. PATENT DOCUMENTS

| | | | |
|---|---|---|---|
| 5,418,852 A * | 5/1995 | Itami et al. | 705/57 |
| 6,735,693 B1 * | 5/2004 | Hamlin | 713/168 |
| 7,650,503 B2 * | 1/2010 | Mizushima et al. | 713/172 |
| 2002/0026587 A1 | 2/2002 | Talstra et al. | |
| 2004/0059916 A1 | 3/2004 | Mizushima et al. | |

FOREIGN PATENT DOCUMENTS

| | | |
|---|---|---|
| JP | 2003337803 | 11/2003 |
| JP | 2004-104539 | 4/2004 |
| JP | 2005-157609 | 6/2005 |
| KR | 19990076464 | 10/1999 |
| KR | 1020050115151 | 12/2005 |
| KR | 1020070076848 | 7/2007 |
| KR | 1020080071549 | 8/2008 |
| KR | 1020090072717 | 7/2009 |

* cited by examiner

*Primary Examiner* — Hosuk Song
(74) *Attorney, Agent, or Firm* — The Farrell Law Firm, P.C.

(57) ABSTRACT

A method and a non-volatile memory apparatus for cloning prevention is provided. The non-volatile memory apparatus includes an Enhanced Media Identification (EMID) area, which is located in a specific area of the non-volatile memory, and stores an EMID for identifying the non-volatile memory; and an EMID encoder for modifying the EMID by a preset operation in conjunction with an arbitrary value.

19 Claims, 5 Drawing Sheets

NON-VOLATILE MEMORY FOR ANTI-CLONING AND AUTHENTICATION METHOD FOR THE SAME

PRIORITY

This application claims priority under 35 U.S.C. §119(a) to a Korean Patent Application filed in the Korean Intellectual Property Office on Sep. 10, 2010 and assigned Serial No. 10-2010-0088960, and a Korean Patent Application filed in the Korean Intellectual Property Office on Oct. 11, 2010 and assigned Serial No. 10-2010-0099010, and a Korean Patent Application filed in the Korean Intellectual Property Office on Sep. 2, 2011 and assigned Serial No. 10-2011-0089051, the entire content of each of which is incorporated herein by reference.

BACKGROUND OF THE INVENTION

1. Field of the Invention

The present invention relates to a non-volatile memory for anti-cloning and an authentication method for the same.

2. Description of the Related Art

As technologies such as Digital Rights Management (DRM) and copy protection for protecting content are combined with Non-Volatile Memories (NVMs), for protecting the content, technology for encrypting content as well as technology for verifying the allowability of Hard Ware (H/W) of storage devices are required.

Although DRM technology, Content Protection for Recordable Media (CPRM) technology for Secure Digital (SD) cards, and Advanced Access Content System (AACS) technology for media such as Blu-Ray® discs, provide their own device authentication methods based on Public Key Infrastructure (PKI) or other cryptographic technologies, these authentication methods may not provide protection against certain forms of attacks, such as cloning or replicating entire storage devices and fraudulent storage medium authentication of genuine player devices.

Although technologies for inserting watermarking or fingerprinting into directly into a side of hardware itself, such as during the chip design process, enable discovery of potential fraudulent clone hardware, such technologies are primarily limited to post-tracing security piracy. Therefore, such technologies may not prevent piracy in advance, thus, these technologies may not be effectively used as methods for verifying whether devices have proper permissions while transactions are performed.

Device authentication methods provided through technologies such as CPRM for SD cards and AACS for Blu-Ray discs, include methods for storing an identifier in an area designated as a read-only area at the time of producing a storage medium and using the stored identifier for device authentication and content protection by applying a cryptographic scheme, but such authentication may not prevent fraudulent hardware vendors from easily cloning a large number of authenticated devices.

As described above, currently known authentication methods may not prevent certain attacks, such as when a card fabricator produces multiple cards having the same security information and/or clones genuine or original content in the cards, or when such a card fabricator produces clone cards by reading security information and content and inserting the same information in the clone cards for illegal distribution of content. Current authentication methods are may also be vulnerable to attacks where a malicious controller intercepts an identifier of a NAND chip by changing the firmware and uses the intercepted identifier for fraudulent authentication.

FIG. 1 is a diagram illustrating fraudulent authentication of a conventional storage medium.

Referring to FIG. 1, an attack of a conventional storage medium may be performed by recording, at step 130, the security information and content stored in a genuine memory card 110 in a clone card 120, and authenticating, at step 150, a genuine player 140 by manipulating the firmware of a controller. This attack production of clone cards containing illegal content to be placed on the market until the clone cards are totally discarded, thereby inflicting significant financial damages on content providers and terminal manufacturers.

When value-added content is recorded in storage devices to be sold and/or rented, the built-in security technology may include anti-cloning technology for rendering mass illegal hardware cloning ineffective. To increase the complexity of the hardware cloning attacks, it is desirable to take advantage of the unique physical properties of each storage device, which have low collision probability.

However, taking advantage of all the physical properties of the entire memory may be inefficient, due to the increasing memory size corresponding to a few to hundreds of gigabytes, and using predefined specific areas may also not be used as anti-cloning technology, because use of the predefined areas may actually reduce the complexity of cloning attacks.

SUMMARY OF THE INVENTION

An aspect of an embodiment of the present invention is to provide a non-volatile memory as an anti-cloning measure that is robust against attacks where a clone storage medium is disguised as a storage medium containing genuine content, and an authentication method for the same.

In accordance with one aspect of the present invention, a non-volatile memory for anti-cloning is provided. The non-volatile memory includes an Enhanced Media Identification (EMID) area, which is located in a specific area of the non-volatile memory, and stores an EMID for identifying the non-volatile memory; and an EMID encoder for modifying the EMID by a preset operation in conjunction with an arbitrary value.

In accordance with another aspect of the present invention, a method for authenticating a non-volatile memory for anti-cloning is provided. The method includes receiving a request an Enhanced Media Identification (EMID) from a host device by the non-volatile memory that stores an EMID for identifying the non-volatile memory in an EMID area located in a specific area of the non-volatile memory; modifying the EMID by a preset operation with an arbitrary value; and transmitting the modified EMID to the host device in response to the request.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention are described in detail herein with reference to the accompanying drawings. In the following description, specific details such as detailed configuration and components are presented to assist in providing an overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

According to an embodiment of the present invention, a non-volatile memory for anti-cloning and an authentication method for the same are provided. To this end, an Enhanced Media Identification (EMID) is inserted in a specific area of a storage medium. The storage medium, which includes means for generating noise in the EMID, adds the noise in the EMID upon receiving an EMID request, and provides the noise-added EMID, thereby performing authentication.

A storage media, recording devices, means for generating an EMID during manufacturing of player devices, and means for decoding the EMID used in provided a series of authentication processes in accordance with embodiments of the present invention are described as follows with reference to FIG. 2.

Figure 1:
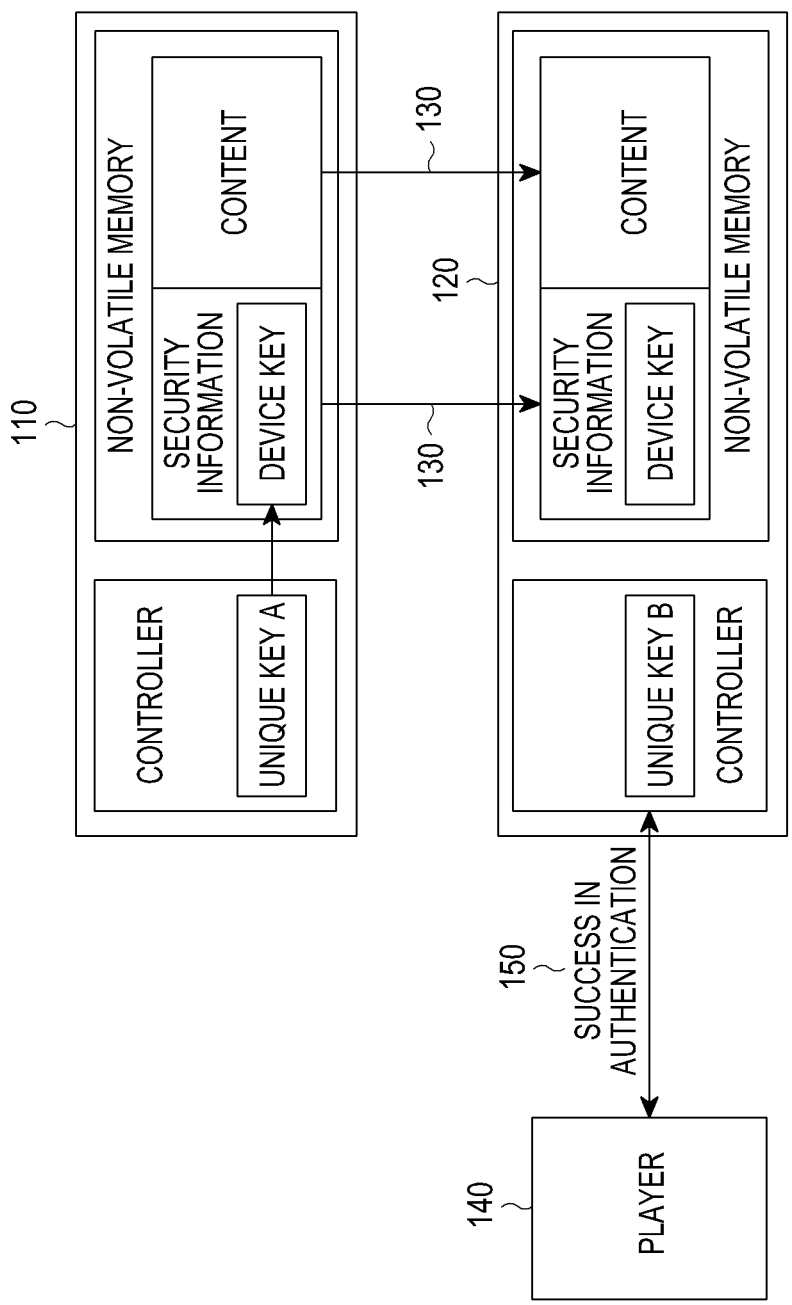
FIG. 1 is a diagram illustrating fraudulent authentication of a conventional storage medium.
Figure 2:
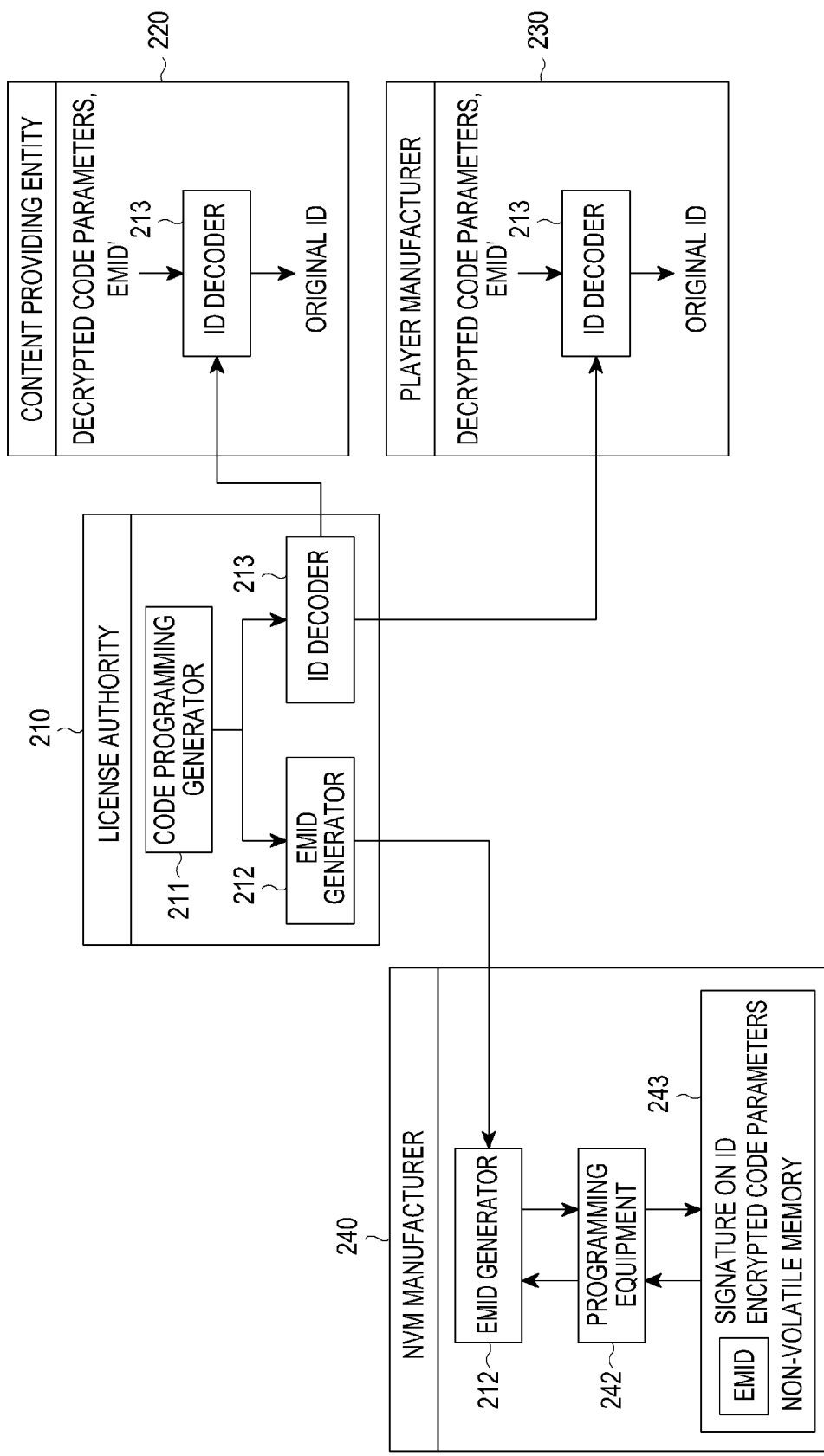
FIG. 2 is a diagram illustrating a technology model for authenticating a storage medium according to an embodiment of the present invention.

FIG. 2 illustrates a technology model for authenticating a storage medium according to an embodiment of the present invention.

Referring to FIG. 2, a license authority 210 for determining a storage device authentication method according to the present invention, first determines an EMID generator 212 for encoding an ID, an ID decoder 213 for decoding the encoded EMID, and a code parameter generator 211 for generating code parameters used to determine a decoding scheme.

A content providing entity 220 for providing content by recording the content in storage devices, such as a kiosk and/or a content aggregator, may receive the ID decoder 213 determined by the license authority 210 and convert decrypted code parameters and a modified (noise-added) EMID into the original ID. Through these receiving and converting operations, the content providing entity 220 authenticates physical identifiers of storage devices, binds genuine content to the authenticated physical identifiers, and records the bound genuine content.

A player manufacturer 230, which manufactures players for playing content in storage devices, may also receive the ID decoder 213 determined by the license authority 210 and convert decrypted code parameters and a modified (noise-added) EMID into the original ID. The player manufacturer 230 manufactures player devices having functions for performing these receiving and converting operations. The manufactured content player devices may authenticate physical identifiers of storage devices and play content recorded in genuine storage devices using the authentication method proposed by the present invention.

An NVM manufacturer 240, which manufactures storage devices, may receive the EMID generator 212 determined by the license authority 210. When manufacturing storage devices, the NVM manufacturer 240 generates EMIDs, or encoded IDs, using the EMID generator 212, and inserts the EMIDs in the storage devices using programming equipment 242 such that the EMIDs may be recorded only once in a specific area of the storage devices during manufacture. Thereby, the NVM manufacturer 240 manufactures storage devices that each includes a specific area in which an EMID and a signature-on-ID and encrypted code parameters are recorded.

Figure 3:
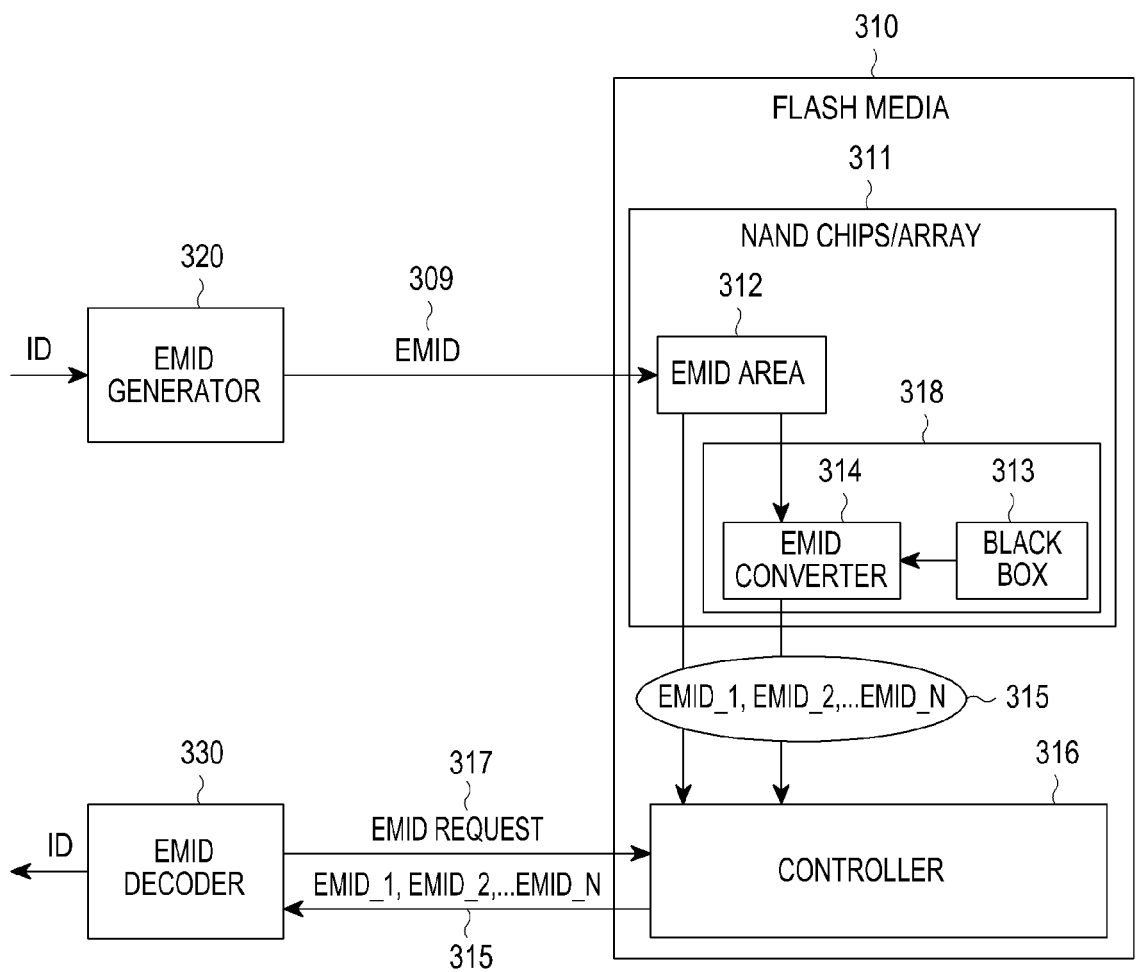
FIG. 3 is a diagram illustrating a structure of a storage device during authentication of the storage device according to an embodiment of the present invention.

FIG. 3 illustrates a configuration of an authentication system for authentication of a storage device according to an embodiment of the present invention.

Referring to FIG. 3, a storage device 310 according to an embodiment of the present invention may be a storage medium such as a flash memory.

The storage device 310 includes a controller 316 for controlling input/output and read/write of the storage device 310, and a NVM memory area 311, such as a NAND flash memory area for storing data. The NVM memory area 311 includes an arbitrarily defined EMID area 312 for storing an EMID.

The EMID area 312 includes a type-1 area and a type-2 area. The type-1 area is an area used in the NVM memory area 311, where reading and writing, by a host device or the controller 316 for performing recording or playing of a storage device, are prevented after a process for the storage device is completed. The type-2 area is an area that the host device, such as a recording device or a playing device, may read in response to a read command from the storage device 310.

The EMID encoder 318 includes an EMID converter 314 for performing EMID conversion operation and a black box 313 for generating random errors used to perform the EMID conversion operation. The EMID converter 314 generates noises by modifying an EMID value through a preset operation with random values (i.e., random errors) generated by the black box 313, unique information of the NVM memory area 311, which is included in the type-1 area of the EMID area 312, and a value for the EMID conversion operation, which is received from the host device in advance.

The black box 313 may include specific seed information that the EMID converter 314 uses for the EMID conversion operation, or may generate seed information at random using a specific additional circuit. In addition, when using elements generated in the system, the black box 313 may dynamically generate seed information.

An EMID generator 320 generates an EMID 309 by encoding a value selected as an ID using a preset encoding scheme.

An EMID decoder 330 receives at least one noise-added EMID 315 and decodes it into its original EMID.

Upon extracting a physical identifier or an EMID 309 inserted in the EMID area 312, EMID encoder 318 generates noise in the EMID. This EMID encoder 318 may include at least one of a random number generator and a scrambler. The EMID encoder 318 generates a noise-added EMIDs 315.

During recording or playing of the storage device 310, the controller 316 delivers the noise-added EMIDs 315 to the EMID decoder 330 of the device in response to an EMID request 317 from a recording or playing device. In other words, the controller 316 receives a request for EMID information from a recording device for recording content in the storage device 310 and/or from a player device for playing content stored in the storage device 310, and delivers noise-added EMID information to the recording device or the player device in response to the request.

Upon receiving, from the recording or playing device, a command requesting an EMID of the storage device 310, the controller 316 delivers a command to read the EMID area 312 of the storage device 310 to the NVM memory area 311. In response to the command, the NVM memory area 311 adds noise in the EMID 309 read from the EMID area 312 in accordance with at least one of noise generation/insertion schemes proposed by the present invention, and delivers the noise-added EMID 315 to the recording or playing device through the controller 316. As a result, in accordance with an embodiment of the present invention, an external device outside the NVM memory area 311, for example, the controller 316, cannot directly access the value stored in the EMID area 312.

According to an embodiment of the present invention, the storage device 310 includes the EMID encoder 318 for generating noise-added EMID information by generating random errors in EMID information.

Figure 4:
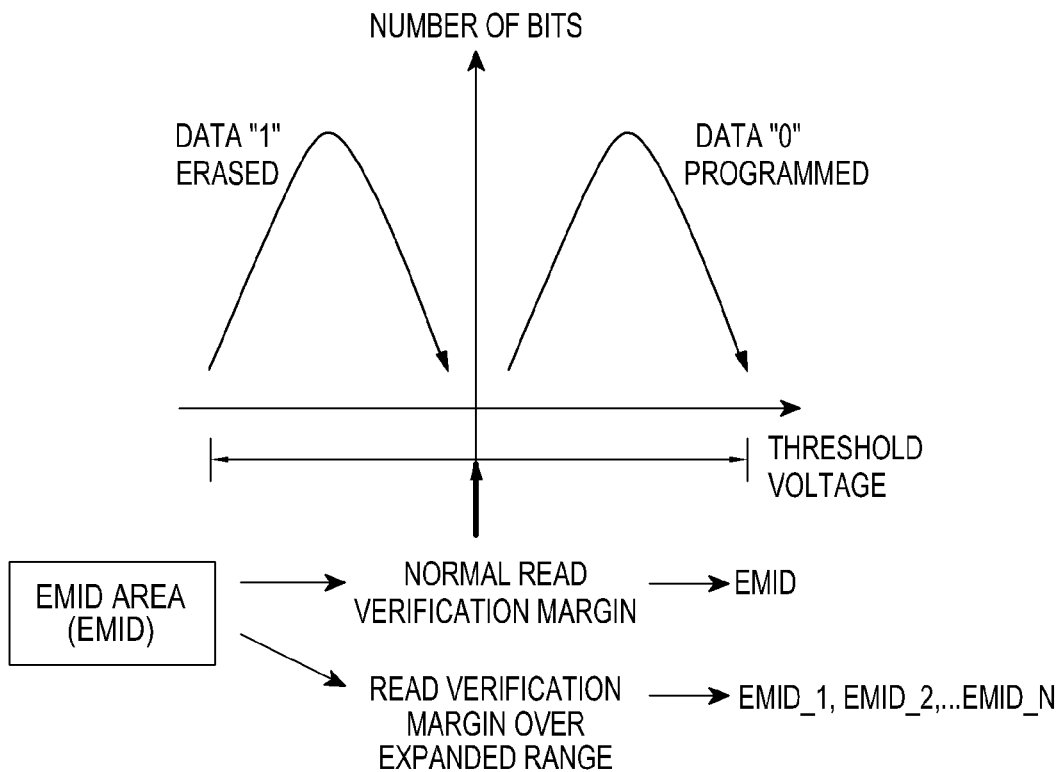
FIG. 4 is a diagram schematically illustrating a noise generation scheme for a storage device according to an embodiment of the present invention.

FIG. 4 schematically illustrates a noise generation scheme for a storage device according to an embodiment of the present invention. A first method ("Method 1" in FIG. 3) for inserting noise in an EMID is an example of a method that includes changing a margin voltage used in a read operation of the NVM memory area 311. As illustrated in FIG. 4, the original EMID value 309 may be read when the EMID area 312 is read according to the normal read verification margin, whereas errors may occur at random if the read verification margin is expanded to a specific range. In the present invention, a noise-added EMID may be generated by expanding the read verification margin to a specific range. Multiple noise-added EMIDs EMID_1, EMID_2, ..., and EMID_N may be generated by reading the EMID over the specific range several times.

An external device, such as the controller 316, is not configured to control this operation, and is set to allow the NVM memory area 311 to change the read verification margin only for the EMID area 312.

A second method (Method 2 in FIG. 3) for inserting noise in an EMID value is an example of a method that includes providing separate circuits for generating random errors in an EMID 309. According to an embodiment of the present invention, the noise generator 314 and the seed 313 are configured based on technology for generating random errors, such as Liner Feedback Shift Register (LFSR) and Pseudo Random Number Generator (PRNG). In this method, if a value of the EMID area 312 is requested by the controller 316, the EMID encoder 318 outputs an EMID value inserted in the EMID area 312, and the noise-added EMID 315, in which noises are inserted using the value generated in the black box 313. The EMID converter 314 may be designed based on technology for generating random errors, such as LFSR and PRNG. A seed value may be dynamically determined as system information.

The EMID 309, which is recorded in a specific area of the storage device, is converted into multiple EMIDs 315, in which noises are included by the EMID encoder 318 at the request of the content recording or playing device. During EMID extraction, an operation according to an embodiment of the present invention may repeatedly perform the process of generating multiple noise-added EMIDs. In this case, the process of generating multiple noise-added EMIDs at once by the EMID encoder 318 may be defined as a round. In accordance with an embodiment of the present invention, the recording or playing device (not shown) requests an EMID from the storage device 310 several times, and then, the storage device 310 generates EMIDs of a related round using the EMID encoder 318 at each request (i.e., in each round), and transmits the generated EMIDs to the recording or playing device.

Figure 5:
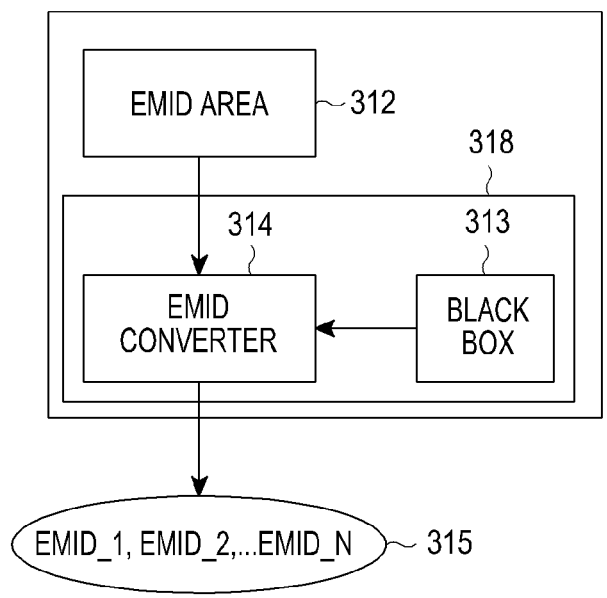
FIG. 5 is a diagram illustrating a structure of a non-volatile storage medium according to an embodiment of the present invention.

FIG. 5 illustrates a structure of a non-volatile storage medium according to an embodiment of the present invention.

Referring to FIG. 5, a non-volatile storage medium (or NVM memory area) 311 includes an arbitrarily defined EMID area 312 for storing an EMID, a EMID encoder 318 including an EMID converter 314 for converting an EMID by generating noise in the EMID, and a black box 313 for generating a random error value used for EMID conversion.

Upon extracting a physical identifier or an EMID inserted in the EMID area 312, the EMID encoder 318 inserts noise in the extracted physical identifier or EMID. The EMID encoder 318 generates multiple noise-added EMIDs 315 including random errors generated by the EMID encoder 314. In accordance with the preset invention, to prevent cloning of storage devices, an external device outside the NVM memory area 311, for example, the controller 316 may not directly access the value stored in the EMID area 312.

Figure 6:
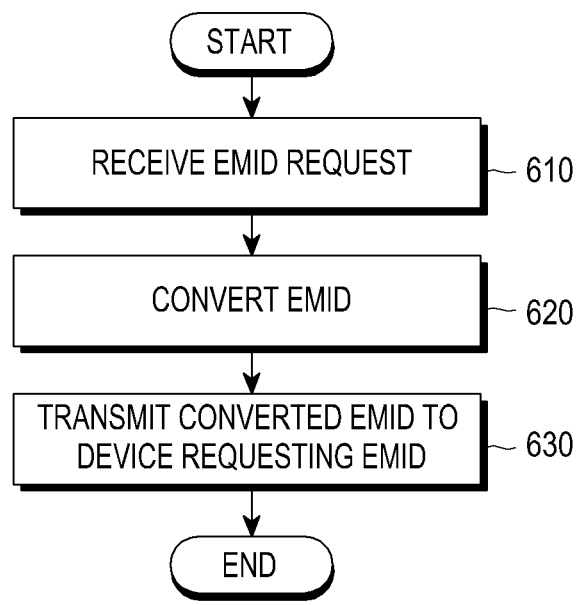
FIG. 6 is a flow diagram illustrating an operation of a storage device during authentication of the storage device according to an embodiment of the present invention.

FIG. 6 illustrates an operation of a storage device during authentication of the storage device according to an embodiment of the present invention.

Referring to FIG. 6, the storage device 310 receives a request for reading an EMID from a recording or playing device in step 610. Specifically, the storage device 310 receives the request for reading an EMID from the recording or playing device through the controller 316, and forwards the EMID to the NVM memory area 311.

In step 620, the NVM memory area 311 reads an EMID 309 from the EMID area 312, and inserts noise in the EMID using any one of Method 1 of changing a read verification margin in a read operation and Method 2 of using the EMID encoder 318, such as described with reference to FIG. 3, thereby generating multiple noise-added EMIDs 315.

In step 630, the NVM memory area 311 delivers the multiple noise-added EMIDs generated in step 620, to the recording or playing device through the controller 316.

As is apparent from the foregoing description, embodiments of the present invention take advantage of physical properties of a defined area of a non-volatile memory, and provide an apparatus that includes a mechanism for generating noise inside the storage device, making it possible to dynamically process system information upon extracting information about the defined area. Embodiments of the present invention may provide a storage medium that is robust against indirect (e.g., "man-in-the middle") attacks by a controller assembled in a non-volatile memory.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:
1. A non-volatile memory for anti-cloning, comprising:
  an Enhanced Media Identification (EMID) area, which is located in a specific area of the non-volatile memory, and stores an identification for identifying the non-volatile memory; and an EMID encoder for modifying the identification by a preset operation in conjunction with an arbitrary value,
wherein the EMID area includes a first area in which reading by an external device is prevented, and a second area in which reading from the non-volatile memory by the external device is permitted in response to a read command.

2. The non-volatile memory of claim 1, wherein the EMID encoder includes an EMID converter for performing an EMID conversion operation, and a black box for generating a random error used for performing the EMID conversion operation.

3. The non-volatile memory of claim 2, wherein the EMID encoder modifies the identification by the preset operation using a random error generated in the non-volatile memory, unique information included in the identification, and a value for EMID encoding, which is received from an authentication device.

4. The non-volatile memory of claim 1, wherein the EMID encoder includes means for changing a read verification margin voltage in connection with an operation of reading the identification information stored in the EMID area.

5. The non-volatile memory of claim 1, wherein the EMID encoder includes a noise generator having a separate circuit for generating random errors in the identification.

6. The non-volatile memory of claim 5, wherein the noise generator includes at least one of a Liner Feedback Shift Register (LFSR) and a Pseudo Random Number Generator (PRNG).

7. The non-volatile memory of claim 5, wherein the noise generator includes a scrambler.

8. The non-volatile memory of claim 5, wherein a seed used by the noise generator for noise generation is dynamically determined based on system information.

9. The non-volatile memory of claim 1, further comprising a controller for receiving a request for EMID information from at least one of a recording device for recording content in the non-volatile memory and a playing device for playing content stored in the non-volatile memory, and delivering the noise-added EMID information to at least one of the recording device and the playing device in response to the request.

10. The non-volatile memory of claim 1, wherein, in modifying the identification by the preset operation, the EMID encoder generates a plurality of the modified EMIDs.

11. A method for authenticating a non-volatile memory for anti-cloning comprising:
receiving a request for an Enhanced Media Identification (EMID) from a host device by the non-volatile memory that stores an identification for identifying the non-volatile memory in an EMID area located in a specific area of the non-volatile memory;
modifying the identification by a preset operation with an arbitrary value; and
transmitting the modified identification to the host device in response to the request,
wherein the EMID area includes a first area in which reading by an external device is prevented, and a second area in which reading from the non-volatile memory by the external device is permitted in response to a read command.

12. The method of claim 11, wherein modifying the EMID includes modifying the identification by the preset operation using a random error generated in the non-volatile memory, unique information included in the identification, and a value for EMID encoding, which is received from an authentication device.

13. The method of claim 11, wherein modifying the identification includes changing a read verification margin voltage in connection with an operation for reading the EIMD information stored in the EMID area.

14. The method of claim 11, wherein modifying the identification includes adding noise using a noise generator having a separate circuit for generating random errors in the identification.

15. The method of claim 14, wherein the noise generator includes at least one of a Linear Feedback Shift Register (LFSR) and a Pseudo Random Number Generator (PRNG).

16. The method of claim 15, wherein a seed used for noise generation is dynamically determined based on system information.

17. The method of claim 14, wherein the wherein the noise generator includes a scrambler.

18. A non-volatile memory for anti-cloning, comprising:
an Enhanced Media Identification (EMID) area, which is located in a specific area of the non-volatile memory, and stores an identification for identifying the non-volatile memory; and
an EMID encoder for modifying the identification by a preset operation in conjunction with an arbitrary value,
wherein the EMID encoder includes an EMID converter for performing an EMID conversion operation, and a black box for generating a random error used for performing the EMID conversion operation.

19. A method for authenticating a non-volatile memory for anti-cloning comprising:
receiving a request for an Enhanced Media Identification (EMID) from a host device by the non-volatile memory that stores an identification for identifying the non-volatile memory in an EMID area located in a specific area of the non-volatile memory;
modifying the identification by a preset operation with an arbitrary value; and
transmitting the modified identification to the host device in response to the request,
wherein modifying the identification includes modifying the identification by the preset operation using a random error generated in the non-volatile memory, unique information included in the identification, and a value for EMID encoding, which is received from an authentication device.

* * * * *